United States Patent
Mozer et al.

(10) Patent No.: US 8,825,020 B2
(45) Date of Patent: Sep. 2, 2014

(54) INFORMATION ACCESS AND DEVICE CONTROL USING MOBILE PHONES AND AUDIO IN THE HOME ENVIRONMENT

(75) Inventors: Todd F. Mozer, Los Altos Hills, CA (US); Forrest S. Mozer, Berkeley, CA (US)

(73) Assignee: Sensory, Incorporated, Santa Clara, CA (US)

( * ) Notice: Subject to any disclaimer, the term of this patent is extended or adjusted under 35 U.S.C. 154(b) by 147 days.

(21) Appl. No.: 13/369,129

(22) Filed: Feb. 8, 2012

(65) Prior Publication Data

US 2013/0183944 A1    Jul. 18, 2013

Related U.S. Application Data

(60) Provisional application No. 61/585,982, filed on Jan. 12, 2012.

(51) Int. Cl.
*H04W 88/02* (2009.01)

(52) U.S. Cl.
USPC ............ 455/414.1; 455/420; 379/102.01; 704/270.1; 704/275

(58) Field of Classification Search
USPC .............. 455/414.1, 418–420, 550.1, 563; 704/246, 270.1, 273, 274, 275, 704/E21.019; 379/102.01, 102.02, 102.03, 379/102.05
See application file for complete search history.

(56) References Cited

U.S. PATENT DOCUMENTS

| | | | | |
|---|---|---|---|---|
| 5,255,307 A * | 10/1993 | Mizikovsky | | 455/432.1 |
| 5,802,467 A * | 9/1998 | Salazar et al. | | 455/420 |
| 5,881,134 A * | 3/1999 | Foster et al. | | 379/88.01 |
| 7,464,035 B2 * | 12/2008 | Funk et al. | | 704/275 |
| 8,217,781 B2 * | 7/2012 | Ebrom et al. | | 340/531 |
| 8,350,694 B1 * | 1/2013 | Trundle et al. | | 340/539.11 |
| 2009/0271002 A1 * | 10/2009 | Asofsky | | 700/3 |
| 2009/0316671 A1 * | 12/2009 | Rolf et al. | | 370/338 |
| 2010/0127854 A1 * | 5/2010 | Helvick et al. | | 340/539.14 |

* cited by examiner

*Primary Examiner* — Cong Tran
(74) *Attorney, Agent, or Firm* — Fountainhead Law Group, PC

(57) ABSTRACT

Embodiments of the present invention are directed toward systems, methods and devices for improving information access to and device control in a home automation environment. Functionality of multiple household device, such as lights, sound, entertainment, HVAC, and communication devices can be activated via voice commands. The voice commands are detected by a nearby control device and relayed via a network communication medium to another control device to which the desired device or system that the user wants to operate is connected. Each control device, disposed throughout the home, can detect a voice command intended for another control box and household device and relay the voice command to the intended control box. In such systems, a user can initiate a telephone call by saying a voice command to a local control box that will forward on the control signal to a mobile phone connected to another control box.

25 Claims, 5 Drawing Sheets

INFORMATION ACCESS AND DEVICE CONTROL USING MOBILE PHONES AND AUDIO IN THE HOME ENVIRONMENT

CROSS REFERENCE TO RELATED APPLICATIONS

This Application is related to and claims priority to U.S. Provisional Patent Application No. 61/585,982, titled, "Home Automation System," filed on Jan. 12, 2012. This Application is also related to U.S. patent application Ser. No. 12/135,984, titled, "Systems and Methods of Sonic Communication," filed Jun. 9, 2008, now U.S. Pat. No. 8,204,238, issued Jun. 19, 2012, and U.S. Pat. No. 5,790,754, titled, "Speech Recognition Apparatus For Consumer Electronic Applications," issued Aug. 4, 1998. Each of these provisional and non-provisional patent applications and issued patents are hereby incorporated by reference for all purposes.

BACKGROUND

The present invention relates to home automation systems, devices, and methods for voice controlled home automation, and in particular, to improved information access and device control using audio in the home environment.

Unless otherwise indicated herein, the approaches described in this section are not prior art to the claims in this application and are not admitted to be prior art by inclusion in this section.

Home automation systems provide users with the ability to control and monitor various home appliances and systems, such as lighting, heating, air conditioning, entertainment, and security systems. In many conventional systems, each system is controlled through a dedicated remote control device, control panel, or a hosted or standalone computer program that communicates with the desired device or system via one or more wired or wireless networks. Each of these systems include the similar limitations related to the use of a control device and network that prevent widespread adoption of home automation in new and existing homes.

For instance, controlling electrical devices in the home from within the home, or from a remote location, usually requires a control device that has a complex user interface consisting of many buttons or an extensive menu-driven command structure in order to reach and command any of several tens of controllable devices in a home. Such user interfaces can be cumbersome and confusing for many users. Additionally, unless the control device is permanently installed in a fixed location, which reduces the flexibility and convenience of the system, users need to keep track of the remote control device for each system. While such drawbacks have been somewhat mitigated by the use of control application executed on a device that a user will typically always have on his or her person, such as a smart phone or PDA, controlling different types of home devices and systems often requires the user to execute or otherwise access separate applications on their portable computing or communication devices. While this can simplify the control of some home automation systems, running separate applications still requires a user to remember which application controls which systems and to access the device whenever he or she would like to control one of the home automation systems.

Furthermore, each household device that a user would like to control using convention home automation systems requires an expensive internal or add-on control box or network interface card (NIC), such as an Ethernet adaptor, wireless network adapter, or 60 Hz power line network devices, in order for the household device to be responsive to commands. For example, a den with three lamps, a TV set, and a hi-fi system, would require at least five control device to interface with all of the devices in the room. The addition of anymore devices, of course, would require an additional control device. An entire house with several rooms with several control devices to control several household devices would require at least few dozen control devices. Such implementations make for an expensive systems using current technology.

To simplify deployment in existing homes, conventional home automation systems have been adapted to transmit commands and other information between rooms over existing household electrical power lines or using wireless communications. An example of power line transmission of information is the X10 technology, which is an open industry standard for communication among electrical devices via household electrical wires. In systems that use power line wiring for signaling and control, command signals are transmitted on the electrical power lines at radio frequencies using various digital and analog communication standards between control device, such as the aforementioned X10 protocol.

Another example of communication among control devices within a residence or other building using wireless communication is the Zigbee communication control system. Zigbee enabled devices transmit information between control devices using a wireless network. Such systems also include functionality to monitor a home remotely, manage home energy consumption, lock/unlock doors, operate lights, turn on the televisions and other entertainment devices, adjust environmental control systems.

Despite some of the apparent advantages of these and other conventional home automation systems, each of such system have various shortcomings related to convenience, cost, and functionality. Embodiments of the present invention address these and other drawbacks.

SUMMARY

Embodiments of the present invention are directed toward improved information access and device control using audio in the home environment. In one embodiment the present invention includes a home automation control system that includes a first control device configured to receive a voice command from a user and to transmit the received voice command as a control signal over a network communication medium, and a second control device configured to receive the control signal via the network communication medium and to perform an action in response to the received control signal.

In other embodiments, the home automation system can also include a household device connected to the second control device, so that the action in response to received control signal can include operating the household device. According to various embodiments, the household device can be a lamp, a television, a music player, a mobile communication device, a thermostat, as well as other household devices that operating using electrical power or include electronic controls. In related embodiments, operating the household device includes turning on or turning off the device using an power switch in the control device. The voice command and the control signal can include instructions for multiple household devices, such that the user can issue commands, voice or otherwise, to multiple household devices at one time.

The first control device is can also be configured to perform voice recognition on the received voice command and to determine a user identifier in response to the voice recognition. In such embodiments, the first control device can be further configured to determine a set of preferences in response to the user identifier, a time of day, or a location of the user.

In related embodiments, the first control device can also be configured to receive a voice command from the user from a portable communication device via an external communication medium, such a telephone line or a cellular telephone network. The portable communication device can be a cellular telephone, a smartphone, a laptop computer, a tablet computer, or a personal digital assistant. In related embodiments, the first control device can be further configured to communicate over an external wireless communication medium and further configured to conduct telephone calls over the external wireless communication medium. The portable communication device can be a cellular telephone, a smartphone, a laptop computer, a tablet computer, and a personal digital assistant. The second control device can also be configured transmit an acknowledgement signal to the first control device in response the control signal via the network communication medium.

Other embodiments of the present invention are directed toward methods for controlling a home automation system. Such methods can include receiving a voice command from a user at a first control device, performing voice recognition on the voice command using the first control device, determining a control signal in response to the voice recognized voice command, and transmitting the control signal to a second control device over a network communication medium. The methods can also include, receiving an acknowledgement signal from the second control device over a network communication medium at the first control device and providing the user with a feedback message using the first control device. In such embodiments, providing the user with a feedback message can include playing a synthesized voice sound using the first control device.

In some embodiments, the method for controlling a home automation system can include receiving a voice command from the user that includes a command to make a telephone call and wherein the control signal comprises a signal to activate a mobile telephone connected to the second control device to make the telephone call. In related embodiments, the method can also include transmitting sounds of the user from the first control device to the mobile telephone via the network communication medium and the second control device receiving sounds from the mobile telephone at the first control device via the network communication medium and the second control device and playing the sounds from the mobile phone to the user using the first control device.

In yet other embodiments, the method for controlling a home automation system can also include determining a user identifier in response to voice recognition on the voice command and determining a preference associated with the user identifier, and then determining a control signal is in response to the preference, and a location of the user determined in response to characteristic sounds associated with the user.

In a further embodiment, the home automation system can be configured to send an alert to the user when an unauthorized person is detected.

The following detailed description and accompanying drawings provide a better understanding of the nature and advantages of the present invention.

DETAILED DESCRIPTION

Described herein are techniques for improved information access and device control using audio in the home environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention are directed toward systems, methods, and devices for controlling home automation systems and devices using voice commands from a user. Such embodiments can receive user voice commands via portable consumer devices, such as cell phones, smartphones and other portable communication devices, or via voice-recognition access points or microphones located throughout a home or other building. In embodiments in which a portable consumer device is used, the voice commands can be received when the user is in the building equipped with home automation systems and devices according to various embodiments of the present invention, and also when the user is in a location remote to the building equipped with home automation systems and devices according to various embodiments of the present invention.

Figure 1:
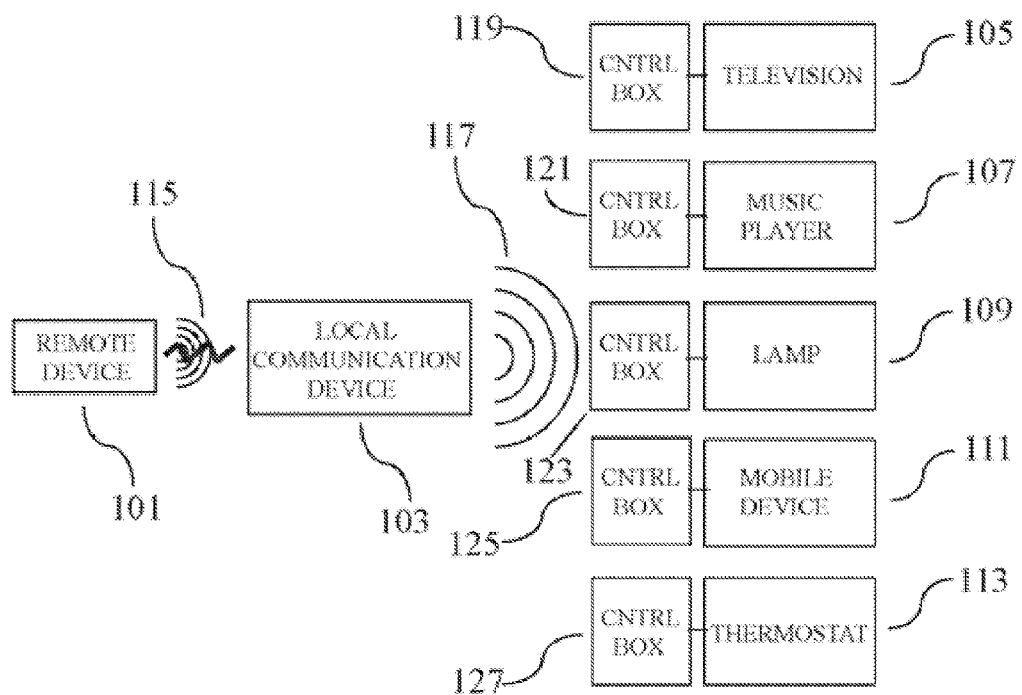
FIG. 1 illustrates a simplified schematic of a home automation system configured to be controlled by a remote user using voice commands according, to one embodiment of the present invention.

In such embodiments, the portable consumer device can receive the voice command, perform a voice recognition determination, transformation or translation, and then send a control message or signal to one or more control devices. In the interest of clarity and simplicity, the term control device is used herein to refer to any device that can send and receive control signals or messages via sonic or electromagnetic signals and that can be connected to or embedded in an electric or electronic household device to control or otherwise operate that household device in response to receiving a voice command. For example, control device can include a sonic transceiver for sending and receiving sonic signals via a sonic network of transceivers and repeaters. Such control devices can also include circuitry to perform actions in response to received sonic signals. One exemplary control device can includes a sonic network transceiver and circuitry, firmware, or software configured to operate a power switch to turn-on or turn-off a lamp that is plugged into the control device. FIG. 1 shows an exemplary system 100 for controlling home automation devices from a remote location according to one embodiment of the present invention.

System 100 includes a number of control devices, designated as control boxes, or "CNTRL BOX," 119, 121, 123, 125, and 127. The system 100 can also include a local communication device 103 and a remote device 101. Each control box can be connected to or otherwise communicatively coupled to any one or more of the household devices shown in FIG. 1. For example, control box 119 can be connected to television 105, control box 121 can be connected to music player 107, such as a stereo system. Similarly, control box 123 can be connected to lamp 109, control box 125 can be connected to mobile device 111, such as mobile telephone, and control box 127 can be connected to a thermostat 113. The connections between control boxes 119, 121, 123, 125, and 127 and the respective household devices 105, 107, 109, 111, and 113 can include an electrical power connection, electrical conversion connection, a control connection for sending and receiving open standard or proprietary control signals and messages. In some embodiments the connections between the control boxes in the household devices can include both wired and wireless connections, such as USB, IEEE 1394, RS-232, Bluetooth, infrared, Wi-Fi, and other legacy and future connections for sending and receiving data and/or power.

In various embodiments, control boxes 119, 121, 123, 125, and 127, can be connected to and in communication with one another via a sonic network. In such embodiments, each control box can include a sonic networking transceiver for sending and receiving sonic networking signals from the other control boxes and other repeaters within the sonic network. In related embodiments, each control box can also act as a repeater for relaying sonic networking messages and signals from one control box to another in the event that the two control boxes that need to communicate are not within range of one another. For example, in embodiments in which control boxes 119, 121, 123, 125, and 127, can all be located in different rooms of a single house. In the event that the control box 119 connected to television 105 located in a living room would like to send a message to the control box 121 connected to music player 107 located in a room that is out of sonic network range from the living room, control box 123 connected to lamp 109 located in a connecting room, such as the hallway, can receive and repeat the signal received from control box 119 directly to control box 125 or via another repeater box. In such embodiments, each control box can act as a repeater in the sonic network.

For purposes of illustration of the functionality of system 100 according to one embodiment, consider a user at a remote location, i.e. away from or on the outside of the house in which system 100 is implemented, desires to turn on lamp 109. The user can use his remote device 101, such as a cellular phone, a smart phone, or other portable communication device, to send a command message by a communication medium 115 to a local communication device situated at the house in which the control boxes and household devices are located. In some embodiments, the remote device 101 can receive input from the user in the form of a voice command. In such embodiments, remote device 101 can include a voice recognition module or voice recognizer to translate the voice command into a digital or analog electronic signal that can be sent via communication medium 115. The digital or analog electronic signal can be in a format compatible with various proprietary or open-standard licensed and unlicensed voice and data communication systems, such as CDMA, GSM, GPRS, 3G, 4G, LTE, WiMax, WiFi, Ethernet, communication protocols. Any and all such formats can communicate with and send signals from remote device 101 to local communication device 103. In some embodiments, remote device 101 can send the voice command received from a user via communication medium 115 as a voice signal via telephone network or the Internet to local communication device 103.

In any such embodiments, local communication device 103 can be a control box located in the house and connected to the Internet or a telephone service, can receive the control signal sent from remote device 101. Once the control signal is received, local communication device can determine an action to perform based on the control signal. For example, embodiments in which the remote device 101 sends a voice signal received from a user, the local communication device can perform a voice recognition function to recognize the voice command contained in the voice signal. Local communication device 103 can also use the voice signal to determine a voice pattern that can be associated with a particular user. Local communication device 103 can then use the voice pattern to determine the particular user that is issuing the voice command and retrieve a preferences or personalization record associated with the particular user. The preferences or personalization record associate with a particular user with a particular voice pattern can be stored in a database, a preferences file, or look up table stored in one or more of the control boxes in particular installation of various embodiments of the present invention.

Once the local communication device 103 has determined the voice command and/or the voice pattern associate with particular user that issued the voice command, the local communication device 103 can send a sonic network control signal via the sonic network to one or more the control boxes 119, 121, 123, 125, and 127, based on the content of the voice command and any preferences that might be associated with the user who issues the command based on the voice pattern.

For example, an adult male user of the household in which the system 100 is installed, would have a voice pattern different from a child male user of the same household in which the system 100 installed. Accordingly if the adult male user uses his remote device 101 to issue voice command, remote device 101 or local communication device 103 could determine that it is the adult male user that is issuing the command and apply user preferences associated with that adult male user to any recognized voice commands it receives. Specifically, the adult male user may have setup preferences, or the system 100 may have determined characteristic habitual settings, associated with the lighting level of a particular lamp 109. As such, whatever the adult male user issues a command to turn on lamp 109 using his remote device 101, remote device 101 or local communication device 103 can determine that the adult male user prefers to have the control Box 103, dim the output of lamp 109 by approximately 50%. Similarly, if remote device 101 or local communication device 103 determines that the user issuing a voice command using remote device 101 is an adult female associated with the system 100, it can use the recognized voice pattern associated with the adult female user to determine various system preferences associated with that user.

For example, if adult female user issues a voice command using remote device 101 to turn on the central heating system connected to thermostat 113 and control box 127, remote device 101 or local communication device 103 can determine, based on the user preferences associated with the adult female user, that control box 127 should communicate to thermostat 113 to set the temperature at 70° F. In related embodiments, the voice command issued by any user, such as the adult male user or the adult female user discussed above, can include an override voice command to override any and all or specific user preferences associated with the user issuing the command. For example, the adult female user may wish to use remote device 101 to turn on the heating system connected to the control box 127 and thermostat 113 but wishes to set the temperature to 65° F. instead of the 70° F. usually associated with the adult female user. In such scenarios, the adult female user may use a voice command that includes an override voice command to designate the specific temperature that she wishes to set which may or may not be different from the temperature designated in the preferences associated with the adult female user.

In related embodiments, local communication device 103 can include an ADSL or DSL modem, a cable modem, a telephone modem, a T-1 transceiver, or other high-speed Internet access module or device. In other embodiments, local communication device 103 can include a cellular communication module for connecting to and communicating with the licensed wireless communication system. In similar embodiments, the communication device 103 can include a wireless networking communication module for connecting to and communicating with an unlicensed wireless communication system, such as a Wi-Fi network. In any such embodiments, local communication device 103 can receive a voice command, either via a voice signal or digital data signal from remote device 101, and determine an appropriate response to that voice command. In some embodiments, the response to the voice command is to translate the voice command into a sonic signal and to transmit that signal to one or more control boxes in the sonic network via sonic, ultrasonic, or subsonic communication signals 117. For example, the voice command a user issues to remote device 101 can be sent to local communication device 103 as a voice signal. Local communication device 103 can then perform voice recognition functions on the voice signal to determine a particular voice command and its associated electronic response. The response can include sending a sonic network compatible signal 117 to one or more the control boxes to activate or otherwise operate one or more of the connected household devices. Specifically, the user can speak the command, "play party playlist," to remote device 101. The remote device 101 can then send the voice signal including, "play party playlist," to the local communication device 103. Local communication device 103 can then translates the voice command, "play party playlist," determines a voice pattern, applies user preferences based on the voice pattern, and then sends the translated voice command with the associated preferences to control box 121 with instructions to activate music player 107 to play the party playlist associated with the user and the preferences. In some embodiments, the voice command, "play party playlist," can be associated with a preference for volume level, speaker selection, equalizer settings all associated with the user who initiated the voice command based on the user's voice pattern and determined location in the house.

While the example above that includes a remote device 101 implemented as a smart phone, other embodiments of the present invention can include implementations of the remote device 101, such as, and iPad®, an iPod®, a tablet computer, laptop computer, desktop computer or similar computing or communication device. In other embodiments, a user can call local communication device 103 using the conventional PSTN or other telephone system. Signal 115 is an electromagnetic signal that travels between remote device 101 and local communication device 103 over one or more communication media that carries either voice or digital or analog electronic command signals.

Once the connection between remote device 101, i.e. a telephone, and the local communication device 103 is established, the user can initiate a voice command to activate one or more of the household devices 105, 107, 109, 111, or 113. For example, the user may want to turn on lamp 109. In such scenarios user can initiate the command to system 100 by speaking the command "turn on the lamp" into remote device 101. The voice command is then sent to local communication device 103 where the command "turn on the living room lamp" is recognized by the speech recognizer in local communication device 103. This speech recognizer may be of a type similar to that described in U.S. Pat. No. 5,790,754, which is incorporated herein by reference. This communication can also be achieved by sending data command signals over the electromagnetic wave or telephone connection that can be initiated by typing commands or selecting command functions in application running, or otherwise executed, on the remote device 101.

In related embodiments, local communication device 103 can verify the received voice command by interacting with the remote user via speech synthesis or digital signals. Then local communication device 103 transmits audio signal 117 which contains the command to turn on lamp 109. As discussed herein, audio signals 117 can include sonic networking signals or amplified or frequency shifted rebroadcasts of the received voice command. For example local communication device 103 can replay the voice command in the users own voice. In such embodiments, the nearest control box can detect the voice command in the users own voice, perform voice recognition functions on the voice command and determine an appropriate response based on the content of the voice command. In some scenarios, the control box that receives the voice command activates or otherwise operates household device to which it is connected or determine that the voice command is intended for another control box connected to another household device. In such embodiments, the control box that receives the voice command from local communication device 103 can relay the voice command by repeating the voice command in the users own voice or translating and transmitting the voice command in a sonic network communication protocol.

Continuing with the "turn on the living room lamp" voice command example, the voice command, in the user's own voice or the sonic network communication protocol, is received by control boxes 119, 121, 123, 125, and 127 but activates only control box 123 which, like other control boxes, contains speech and audio tone recognition software running in a microcontroller, a microphone, a speaker, a relay whose state is controlled by the microcontroller, a connector to plug it into an electrical outlet and a receptacle into which the lamp is plugged.

Control box 123 can recognize the command to switch on the lamp and can change the state of its power relay to achieve this result. Other control boxes, for example control box 127 that controls the thermostat, can differ from control box 123 because they may not include a plug and receptacle. Instead, control box 127 can be built into the thermostat 113.

In some embodiments, communications sent between local communication device 103 and control boxes 119, 121, 123, 125, and 127 may also be achieved by transmission and reception of electromagnetic signals, audio signals, such as voice commands in the user's own voice, sonic networking signals, or a combination thereof. According to various embodiments of the present invention, audio and sonic networking signals have a distinct advantage to provide a much less expensive implementation when compared to using electromagnetic signals.

An example of robust sonic networking signals that might be utilized to send commands from local communication device 103 to the control boxes is the Sensory, Inc. sonic net described in U.S. patent application Ser. No. 12/135,984 titled "Systems and Methods of Sonic Communication," filed Jun. 9, 2008, and which is hereby incorporated by reference. To ensure that the audio signals are received by all the control boxes throughout the home, audio repeaters may be located at a few key points through the home. Because sonic net tones are reliably received over distances of tens of meters, only a few such repeaters may be required a typical home insulation. The function of such repeaters, on hearing sonic net tones or signals, is to retransmit those tones or signals. In some embodiments, control boxes 119, 121, 123, 125, and 127 may function as repeaters. Each control box can include hardware, firmware and software capable of transmitting sonic tones as well as receiving them. As mentioned above, local communication device 103 may also be or include one of control boxes 119, 121, 123, 125, or 127, or household device 111, such as a mobile phone or similar device.

The setup and calibration of the control boxes and audio repeaters to ensure that audio transmissions from the local communication device are received by all the control boxes in the home, can be done in the following way. Each control box can also function as local communication device 103. Control boxes 119, 121, 123, 125, and 127 contain a calibration button and a red/green LED. As the control boxes are installed, the calibration button on the first control box is pressed. Since this is the first control box to be calibrated, it has nothing to communicate with so its LED goes on green. Then the calibrate button on the second control box is pressed, after which it attempts to communicate with the first control box by sending audio signals back and forth. Assuming that it succeeds in this communication, its green LED goes on. Then the calibrate button on the third control box is pressed. Suppose it finds that it can transmit and receive audio signals from the second control box but not from the first control box. Thus, for the third control box to communicate with the first control box, it must transmit its audio signal to the second control box which retransmits it to the first control box. The reverse path is used by the first control box when it desires to transmit to the third control box. The transmission path between the first and third control boxes is stored in memory to make the second control box the repeater in this case. Now, suppose that the fourth control box cannot communicate with any of the earlier control boxes. After calibration, its LED is red, which means that a repeater must be installed between the fourth control box and one of the other control boxes in order to make communication possible between all four control boxes. When this is done, the LED in the fourth box becomes green and its communication path with any of the earlier boxes through the repeater is stored in memory. In this way, calibration of the fifth and later control boxes may proceed such that, in the end, all control boxes are able to communicate with each other.

The remote user operating remote device 101 may also speak complicated commands such as "Turn on the TV in thirty minutes, go to station 24, and record the program." Because recognition of such complex natural speech may be difficult or beyond the computational capabilities for the speech recognizer in local communication device 103, local communication device 103 can send the unrecognized voice command signal via mobile device 111 to a remote server for recognition and then act upon its response. Similarly, local communication device 103 can send the unrecognized voice command signal via sonic network signals 117, desktop, laptop, or server computer connected to one or more control boxes with the sonic network to process the more complex voice recognition functions. The computer can then rebroadcast using its connected control box the recognize voice command to one or all of the connected control boxes to activate the selected or desired functionality of one or more household devices.

Figure 2:
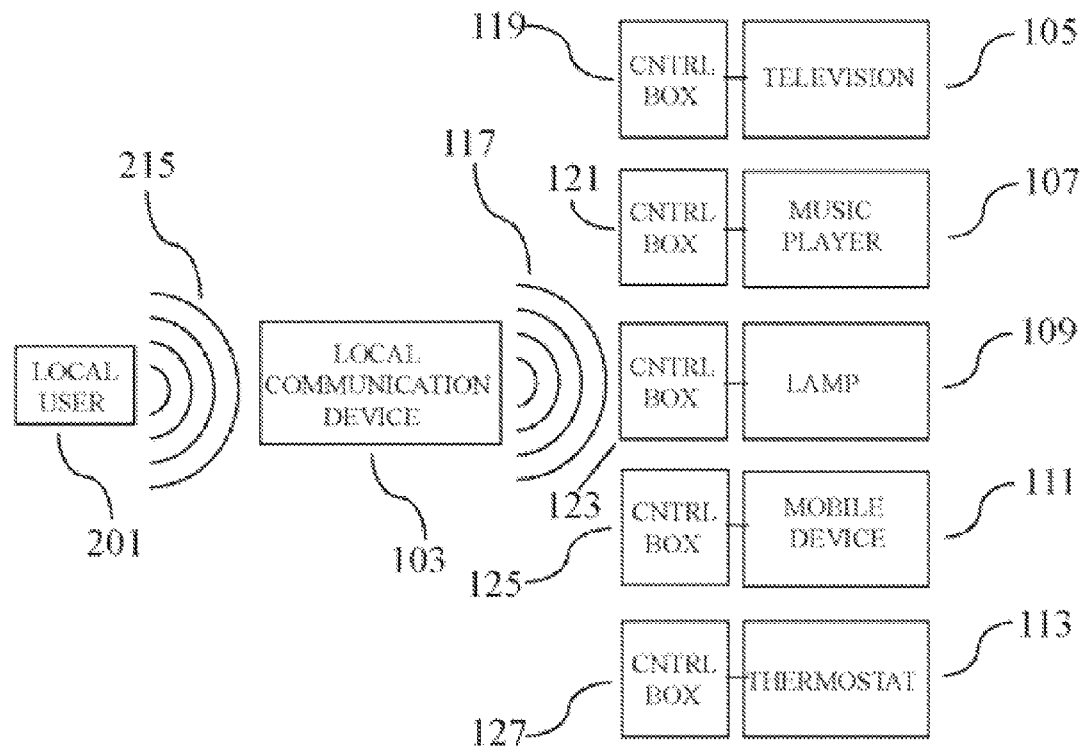
FIG. 2 illustrates another simplified schematic of a home automation system configured to be controlled by a local user using voice commands, according to one embodiment of the present invention.

FIG. 2 shows a system 200 for controlling one or more household devices using voice commands from a local user 201. As shown, user 201 can communicate with a local communication device 103 located in close proximity, i.e. in the same room in which the user is located, by speaking a voice command 215, such as, "Turn on the lamp." The speech recognizer in local communication device 103 can recognize the command and emit sonic networking communication signals or tones 117, which are heard by the recognizers in control boxes 119, 121, 123, 125 and 127. The sonic networking communication recognizer in control box 123 recognizes the command and flips its internal relay to turn on lamp 109. It is emphasized that control boxes 119, 121, 123, 125, and 127 may also function as local communication device 103 depending on the location of local user 201, because each control box can include speech recognition software, hardware, and firmware. As a result, local user 201 can command the home automation system from anywhere in the home where one or more control boxes can detect his voice commands. Such embodiments are advantageous because they include the ability for the user to issue commands from anywhere in the home as opposed to having to stand up and walk to the room where they local communication device 103 is located or find a remote control to input a command through a keypad or other user interface.

Command 215, spoken by local user 201, may be received by more than one of control boxes 119, 121, 123, 125, and 127, serving as local communication devices 103. This may cause several control boxes to transmit sonic tones 117 at nearly the same time. To avoid data collisions the sonic networking system can include anti-collision protocols, such as wait and listen, to ensure that the sonic networking system is immune to such multiple time-delayed commands.

In related embodiments, the physical location of each control box 119, 121, 123, 125, and 127 in the house, or their relative locations, can be determined so the system can determine and store the known locations of each control box. For example, the location of the control box 119 connected to the television 105 can be set and known to be in the living room on the first floor of the house. Similarly, the control 123 connected to lamp 109 can be set or determined to be in the upstairs den of the house. In such embodiments, each control box located in a different room or different locations with a single room can track the movements of the user within the home by detecting sounds from one or more users. For example as an adult male user within the household walks from one room to another, system 200 can determine that the user has moved from one room to another by tracking the sounds of heavy footfalls with a characteristics gait, the voice pattern, or other characteristic sounds of the adult male user. Similarly, the system 200 can track the sounds of the footfalls, voice pattern or other characteristic of a child female user to determine the location of the child female user. By tracking the location of the characteristic sounds and patterns of individual users, the system 200 can track the location of any particular user in the home. Such features are useful in embodiments of the present invention that include home security and monitoring features.

For example, various embodiments of the present invention include user tracking features that can determine where any and all authorized users of the household are located in the home. In such systems, any one of the control boxes can send an alert message to one or more users anytime an additional or an unauthorized user is in the home. The control boxes can listen for and detect sounds from an individual in the home that may be different from the patterns or characteristics sounds associated with the usual or authorized occupants of the home. The control box can listen for foreign voice patterns, foreign footfall patterns, foreign breathing patterns, and other foreign sounds that might indicate that an unauthorized person is in the home.

In one exemplary scenario, the control boxes can track the movement of the authorized members of the household as they move through the house via characteristics sounds of each user. Such characteristic sounds can include breathing patterns so that system according to various embodiments can determine when and where specific members of the household are in the house even when they are sleeping. With such capability, the system can detect unauthorized access to the home by determining when an unauthorized person is present by comparing the detected presence to that of the known location of all authorized members of the household even when they are asleep in their beds. If an unauthorized presence is detected, systems according to various embodiments can sound or send an alert over one more of the communication media described herein.

Figure 3:
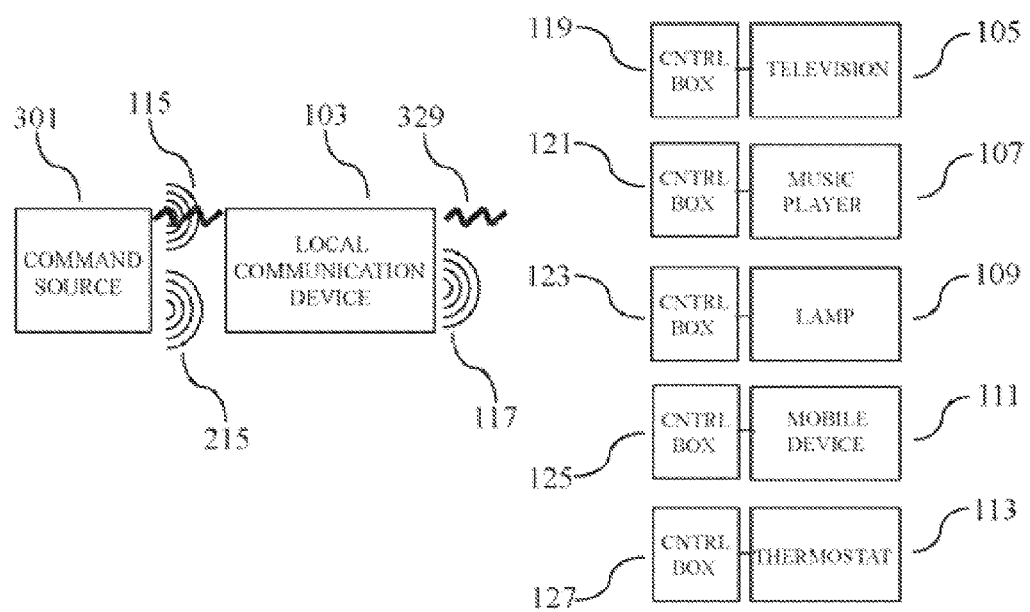
FIG. 3 illustrates yet another simplified schematic of a home automation system configured to be controlled using audio signals and voice commands, according to one embodiment of the present invention.

FIG. 3 shows a simplified schematic of a system 300 for controlling a home automation and monitoring system according to yet another embodiment of the present invention. Command source 301 can include remote device 101 or local user 201. In either case, the command source 301 can issue voice commands that include spoken word, codes, and other sounds in a user's own voice. Accordingly, as discussed above, such systems can use the voice pattern and other sound characteristics of a user's voice to determine user specific preferences and settings associated with the voice pattern. In similar embodiments, the voice pattern can be associated with a user identifier which can then be associated with one or more user specific preferences. Such associations between user identifiers and user-specific preferences or setting can be stored in a table, a database, a look-up table in one or more computer readable memories in one or more of the controls boxes or local communication devices 103. Any of the control boxes can access user-specific preferences or setting over the sonic networking communication system. In related embodiments, user-specific preferences can be coupled with user location and time data to determine dynamic user-specific preferences.

For example, the system can determine command source 301, such as a registered remote device 101 or local user 201, is in the bathroom of the house at 3 am when the user gives the voice command, "turn on the lights." Based on the time and location data and the user-specific preferences, the system 300 can determine that the command source 301, such as the adult male user of the house, prefers to have only half of the bathroom lights to be turned to only 30% when he enters the upstairs bathroom at 3 am. Such embodiments, can also be used to determine that the child female user of the house is in the family room at 3 pm while the male adult user is in the adjoining den working from home. System 300 can then determine, based on the characteristic sounds, voice patterns, and location and time data, that when the female child user issues the command, "turn on television," that the television should only be set to show channels according to the parental controls for restricting television content and at a volume level so as to not disturb the male adult user in the adjoining room. These of course are only a couple of examples. Other dynamic user-specific preferences can be determined based on the household patterns the system determines, time data, user and control box location data, relative locations of multiple users in the household, and user identifiers associated with characteristics sounds and patterns.

In other embodiments, the home automation system 300 can process communication signals and voice commands to function in multiple modes. In some embodiments, command source of 301 can issue or transmit voice commands 115 via an electromagnetic signal to local communication device 103. Local communication device 103 then performs voice recognition using an internal or external voice recognizer to translate, or otherwise recognize, the voice command into a format that is ready to be transmitted via sonic networking communication signals to control boxes 119, 121, 123, 125, and 127. In other embodiments, command source 301 can transmit coded digital command signals 115 via an electromagnetic signal 117 to local communication device 103. Local communication device 103 can translate, or otherwise recognize, the coded digital command signals 115 into a format to be transmitted over sonic networking communication protocols via sonic tones or signals 117 to control boxes 119, 121, 123, 125, and 127. In another embodiment, command source 301 can transmit voice commands via electromagnetic signal 115 to local communication device 103. Local communication device 103 can then translate and transmit the contents of the voice commands via electromagnetic signal 329 to control boxes 119, 121, 123, 125, and 127. In yet another embodiment, command source one 301 can transmit voice commands 215 to local communication device 103. Local communication device 103 can then relay the voice commands and retransmit it as a voice command or other audio signal 117 to control boxes 119, 121, 123, 125, and 127. Finally, in various embodiments, command source 301 can transmit voice commands or other audio signals 215 to local communication device 103. Local communication device 103 can then retransmit the content of the voice commands or other audio signals 215 via electromagnetic signal 329 to control boxes 119, 121, 123, 125, and 127.

Figure 4:
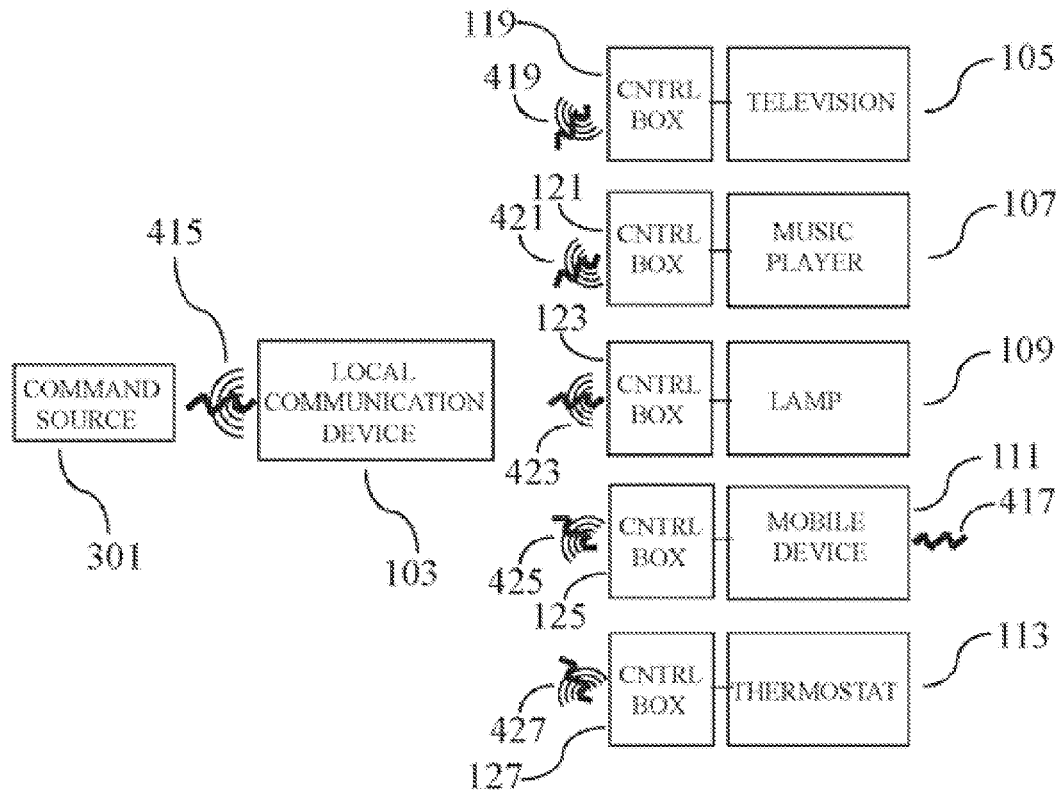
FIG. 4 illustrates a simplified schematic of a home automation system configured to provide feedback to a user, according to one embodiment of the present invention.

Control boxes 119, 121, 123, 125, and 127 and local communication device 103 can also transmit return signals to the user or command source 301, as shown in FIG. 4. The return signals can be used for communication acknowledgement, verification, and error messages to the user or command source to voice commands or other command signals. In the example of a command to turn on lamp 109, control box 123 that receives the command and activates the lamp also sends signal 423 to local communication device 103 via either sonic networking communication signal or an electromagnetic signal that contains the audio message "The lamp is on." This command is relayed by local communication device 103 as audio 415 to the local user who is command source 301 or as audio or an electromagnetic signal 415 to remote user who is command source 301.

In this way hi-fi music can be sent to local communication device 103 from music player 107 by control box 121 that sends the music as audio or electromagnetic wave 421 and local communication device 103 can play the music as audio 415. Because control boxes 119, 121, 123, 125, and 127 can all serve as local communication devices, music may be played through the entire home by the user sending a single verbal command.

Similarly, because mobile device 111 is able to communicate via electromagnetic wave 417 with the internet or a cell phone service provider after receiving turn-on command 117 or 329 from local communication device 103, a user anywhere in the home can make or receive a phone call or obtain data without getting up from the chair in the room where he is sitting. In such embodiments, the mobile device 111, such as a cellular phone or smartphone, can detect a voice command issued by a user and/or relayed by one or more control boxes or the local communication device 103 to place or answer an incoming call.

In various embodiments, audio signals 115, 215, and 415 are speech, audio signal 117 is a series of sonic tones or signals that define commands that are detected by tone recognition circuitry in the sonic networking communication enabled control boxes 119, 121, 123, 125, and 127, and audio signals 419, 421, 423, 425, and 427 may be either sonic tones, speech, or music.

The home automation system described above enables control of single electrical devices at a time. However, it is recognized that multiple commands to electrical devices may also be made according to various embodiments. For example, a command might be given to turn off all the lights in the home at night. The hardware, firmware, and software in the control boxes can also run in an intelligent mode in which they learn and respond to habits of the users. For example, control box 123 might learn to dim the lights in the bathroom if they are turned on between 11:00 PM and 6:00 AM.

In various embodiments, mobile phone control and home automation functionality of systems 100, 200, 300 and 400 includes a number advantages over conventional home automation systems. Specifically, embodiments of the present invention provide a more user-friendly user interface through the use of speech synthesis and recognition, which offers a significant simplification of the user experience when compared to push buttons or menu-driven command systems. Control boxes that can include a microprocessor, a microphone and a speaker, are significantly less expensive than the X10 or other wireless transmitters used in conventional home automation systems. According to various embodiments, the use of voice recognition to control any household device coupled to or equipped with a control box alleviates the user from going to a command box or finding a remote control to submit a command. Also, users are able to receive information from the control boxes and household devices in the home such that he knows the state of these devices and can listen to music from his stereo or other media system or talk on his cell phone from any place in the home equipped with a control box or repeater.

Figure 5:
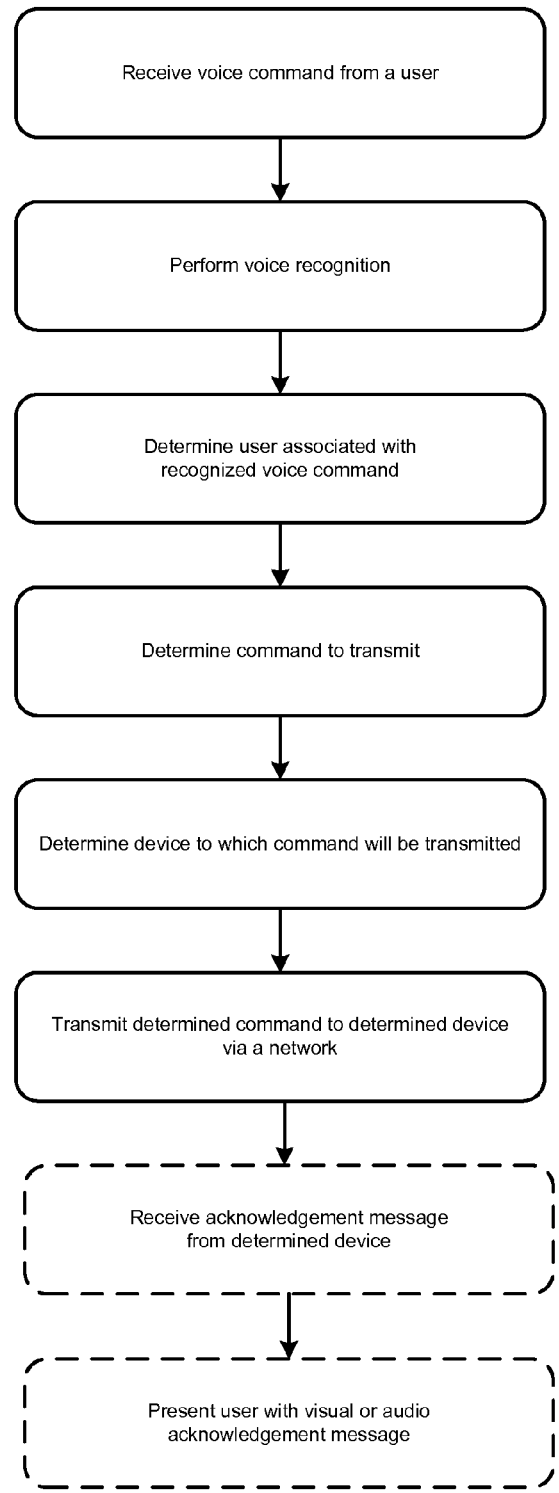
FIG. 5 is a flowchart of a method for using voice control in a home automation system according to one embodiment of the present invention.

FIG. 5 is a flowchart of a method for controlling a home automation system according to various embodiments of the present invention. The method starts with one or more control boxes or local communication devices receiving a voice command from a user in step 510. In some embodiments the voice command is received from a user via a relay through a remote device, such as cellular telephone, a PSTN telephone, or a smartphone. The relayed voice command can be a straight relay or an amplified relay of the voice command in the user's own voice. The relayed voice command can also be in the form of a digital or analog electronic signal transmitted over one or more wired or wireless communication media. In other embodiments, the control boxes or local communication device can receive the voice command via a microphone.

In either case, one or more of the control boxes or local communication devices can perform voice recognition functions on the received voice command to determine the specifics of the desired command, in action 520. If the voice recognition task is too complex or computationally intensive for the microprocessor in the control boxes, then the voice command can be sent to a secondary processer, computer, or other household device connected to the control boxes via one or more communication networks. In such scenarios, the voice command can then be recognized. After the voice command is processed using the voice recognition functions, procedure, transformation, one or more control boxes, the local communication device, or the secondary processor or computer can determine if the voice that issued the voice command can be recognized, in action 530. In the event that the voice of the user that initiates the command is recognizable, then the control boxes, the local communication device, or secondary processor or computer can retrieve a user-specific set of preferences.

Once the voice command is processed using the voice recognition functionality, one or more of the control boxes can determine one or more commands to issue in step 540. The commands, specific command variable and the target household device and control box can be based on or in response to the content of the received and recognized voice command, the contents of a user-specific preference or setting file associated with the recognized user, the time of day, the determined physical location of the user and other users relative to that user, time of year and other household, universal, or user-specific variables. In action 550, one or more of the control boxes, the local communication device or the secondary computer, can determine to which control boxes the command will be transmitted. In such embodiments, the command can be transmitted as an audio command in a sonic network communication with a specific network address for the control box connected to the household device the user would like to operate, in step 560.

In action 570, the control box or the local communication device that received the initial voice command from a user, can receive an acknowledgement from the target household device or target control box that the command has been carried out, met an exception or error, or is currently be processed. The control box or the local communication device that received the initial voice command from a user can then present the user with an audio or visual message regarding the status of the system in response to the voice command. In some systems, action 570 and 580 are optional actions.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A home automation system comprising:
a plurality of control devices associated with a plurality of corresponding physical locations and a plurality of corresponding household devices, wherein the plurality of control devices each comprise a processor, a memory coupled to the processor, a microphone coupled to the processor, a household device connection coupled to the processor, and a network transceiver coupled to the processor, wherein the memory comprises instructions, that when executed by the processor, cause the processor to be configured to:
receive a voice command from a user through the microphone;
determine a physical location of the user relative to the plurality of corresponding physical locations;
perform voice recognition on the voice command;
determine a first control signal in response to the voice recognition and the physical location;
transmit the first control signal using the network transceiver to one or more other control devices in the plurality of control devices over a network communication medium;

receive a second control signal using the network transceiver from one or more other control devices in the plurality of control devices over the network communication medium; and perform an action in response to the second control signal.

2. The system of claim 1 wherein the action in response to the second control signal comprises sending a signal to a household device using the household device connection or relaying the second control signal to one or more other control devices in the plurality of control devices using the network transceiver.

3. The system of claim 1 wherein the network transceiver comprises a sonic network transceiver, and wherein the network communication medium comprises a sonic network communication protocol comprising sonic tones.

4. The system of claim 1 wherein the instructions further cause the processor to be configured to determine a voice pattern from the received voice command, and determine user preferences associated with the user in response to the voice pattern, and wherein the control signal is further determined in response to the user preferences.

5. The system of claim 1 wherein at least one household device connection in the plurality of control devices comprises an electrical outlet connector and an electrical receptacle configured to connect to a household device.

6. The system of claim 1 wherein the instructions further cause the processor to be configured to determine a time of day, and wherein the control signal is further determined in response to the time of day.

7. The system of claim 1 wherein the instructions of at least one memory in the plurality of control devices further cause the corresponding processor to be configured to receive the voice commands from the user from a portable communication device through an external communication medium.

8. The system of claim 1 wherein the instructions further cause the processor to be configured to use the microphone to detect characteristic sounds associated with the user, and to track the physical location of the user based on the characteristics sounds.

9. The system of claim 1 wherein at least one household device connection in the plurality of control devices comprises a connection to connect to a communication device, and wherein the action comprises sending and receiving signals through household device connection to control the communication device to conduct a telephone call.

10. The home automation control system of claim 9 wherein the communication device is selected from the group consisting of a cellular telephone, a smartphone, a laptop computer, a tablet computer, and a personal digital assistant.

11. A method comprising:
receiving, in a first control device comprising a microphone, a household device connection, and a network transceiver, voice commands from a user through the microphone, wherein the first control device is associated with a plurality of other control devices;
determining, in the first control device, a physical location of the user;
performing, in the first control device, voice recognition on the voice command;
recognizing, in the first control device, a voice pattern associated with the user from the voice command;
determining, in the first control device, a first control signal in response to the voice recognition, the physical location and the voice pattern; and transmitting the first control signal using the network transceiver from the first control device to one or more of the plurality of other control devices over a network communication medium;
receiving, in the first control device, other control signals using the network transceiver from one or more of the plurality of other control devices over the network communication medium; and
performing, in the first control device, an action using the household device connection in response to the received other control signals.

12. The method of claim 11 further comprising receiving, in the first control device, an acknowledgement signal in response to the first control signal from the one or more of the plurality of other control devices through the network communication medium using the network transceiver and providing a feedback message.

13. The method of claim 12 wherein providing the feedback message comprises playing a synthesized voice sound.

14. The method of claim 11 wherein the voice command comprises a command to make a telephone call and wherein the control signal comprises a signal to activate a mobile telephone connected to one of the plurality of other control devices to conduct the telephone call.

15. The method of claim 14 further comprising transmitting sounds of the user from the first control device to the mobile telephone through the network communication medium and the one of the plurality of other control devices.

16. The method of claim 15 further comprising receiving sounds from the mobile telephone at the first control device through the network communication medium and the one of the plurality of other control devices and playing the sounds from the mobile phone.

17. The method of claim 11 further comprising:
receiving, by the first control device, from at least one of the plurality of other control devices, one or more signals corresponding to characteristic sounds associated with the user;
and wherein determining the physical location of the user is in response to the one or more signals corresponding to the characteristic sounds.

18. The method of claim 11 wherein the network communication medium comprises a sonic network communication protocol comprising sonic tones, and wherein transmitting the control signal comprises transmitting the first control signal in accordance with the sonic network communication protocol.

19. The method of claim 11 wherein the control signal comprises instructions for multiple household devices.

20. A control device comprising:
a microprocessor;
a memory coupled to the processor;
a microphone coupled to the processor;
a household device connection coupled to the processor; and
a network transceiver coupled to the processor, wherein the memory comprises instructions, that when executed by the processor, cause the processor to be configured to:
receive a voice command from a user through the microphone,
determine a physical location of the user;
perform voice recognition on the voice command;
determine a first control signal in response to the voice recognition and the physical location;

transmit the first control signal using the network transceiver to one or more other control devices in a plurality of other control devices over a network communication medium;

receive a second control signal using the network transceiver from one or more other control devices in the plurality of other control devices over the network communication medium; and perform an action in response to the second control signal.

21. The control device of claim 20 wherein the action in response to the second control signal comprises sending a signal to a household device using the household device connection or relaying the second control signal to one or more other control devices in the plurality of other control devices over the network communication medium using the network transceiver.

22. The control device of claim 20 wherein the network transceiver comprises a sonic network transceiver, and wherein the network communication medium comprises a sonic network communication protocol comprising sonic tones.

23. The control device of claim 20 wherein the instructions further cause the processor to be configured to determine a voice pattern from the received voice command, and determine user preferences associated with the user in response to the voice pattern, and wherein the control signal is further determined in response to the user preferences.

24. The control device of claim 20 wherein the instructions further cause the processor to be configured to determine a time of day, and wherein the control signal is determined further in response to the time of day.

25. The control device of claim 20 wherein the instructions further cause the processor to be configured to use the microphone to detect characteristic sounds associated with the user, and to track the physical location associated with the user based on the characteristics sounds.

* * * * *